(12) United States Patent
Byers et al.

(10) Patent No.: US 9,021,270 B1
(45) Date of Patent: Apr. 28, 2015

(54) COMBINING WAKE-UP AND UNLOCK INTO A SINGLE GESTURE

(75) Inventors: Richard Byers, Waterloo (CA); Jonathan Kliegman, Kitchener (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/485,441

(22) Filed: May 31, 2012

(51) Int. Cl.
*G06F 21/36* (2013.01)
*G06F 3/0488* (2013.01)

(52) U.S. Cl.
CPC ............ *G06F 21/36* (2013.01); *G06F 3/04883* (2013.01); *G06F 3/0488* (2013.01)

(58) Field of Classification Search
CPC .... G06F 21/36; G06F 3/04883; G06F 3/0488
USPC .................................................. 713/182–186
See application file for complete search history.

(56) References Cited

U.S. PATENT DOCUMENTS

| | | | | |
|---|---|---|---|---|
| 2006/0224742 | A1* | 10/2006 | Shahbazi ...................... | 709/226 |
| 2010/0146437 | A1* | 6/2010 | Woodcock et al. ........... | 715/806 |
| 2011/0066984 | A1* | 3/2011 | Li .................. | 715/863 |
| 2011/0237220 | A1* | 9/2011 | Matsuoka ..................... | 455/411 |
| 2011/0300831 | A1* | 12/2011 | Chin .............................. | 455/411 |
| 2011/0302649 | A1* | 12/2011 | Foster et al. .................... | 726/19 |
| 2012/0084734 | A1* | 4/2012 | Wilairat ........................ | 715/863 |
| 2012/0133484 | A1* | 5/2012 | Griffin .......................... | 340/5.54 |
| 2013/0113723 | A1* | 5/2013 | Chen et al. .................... | 345/173 |

OTHER PUBLICATIONS

"Login," Webster's New World Computer Dictionary, 2003, 1 page.*

* cited by examiner

*Primary Examiner* — Chau Le
(74) *Attorney, Agent, or Firm* — Troutman Sanders LLP; James E. Schutz; Jay R. Anderson, Jr.

(57) ABSTRACT

A computer-implemented method, a system and a computer-readable medium provide for receiving a first pattern of sensor inputs that are associated with a user of a mobile device. Subsequently, this pattern can be replicated, and based on the input, used to perform one or more of tasks such as identifying the user, unlocking the device, turning the device on, and authenticating the user.

20 Claims, 5 Drawing Sheets

COMBINING WAKE-UP AND UNLOCK INTO A SINGLE GESTURE

BACKGROUND

1. Field

This field is generally related to activating computing devices.

2. Background

At present, a locked device takes several actions and time to wake up. For example, the wake-up process may involve grasping the device, indicating that a user would like to unlock the device, entering authentication, and validating through feedback that all the steps were done properly. For many use cases, the time spent getting the device ready for use can be longer than the actual use of the device.

Technologies exist such as swipe patterns that aim to remove the need for a passcode. These approaches have their own deficiencies as they require a user to look at the device to validate the pattern and have security issues of leaving smudges on the display that can be easily replicated. Passcode based mechanisms are tedious to enter on a screen.

BRIEF SUMMARY

A user provides a pattern of inputs that alert a mobile device that the user desires to activate the mobile device. For example, the user may activate various sensors associated with the device, such as touchscreens, buttons, a microphone or a camera. The mobile device recognizes the pattern of inputs, and based on the inputs the device activates, combining waking up, unlocking and user selection into a unified process. The pattern may also serve to authenticate the user.

For example, some embodiments include methods, systems, and computer readable storage media that implement the functionality described above. In some embodiments, a first pattern of sensor inputs associated with an authorized user of a mobile device is received, wherein a pattern of sensor inputs comprises a plurality of sensor inputs, each sensor input being a piece of information generated by a sensor communicatively coupled to the mobile device that can be used to identify the authorized user. The first pattern is associated with activation of the mobile device. A second pattern of sensor inputs is received when the mobile device is in an inactive state. It is determined that the second pattern corresponds to the first pattern. The mobile device is activated when it is determined that the second pattern matches the first pattern, wherein the first pattern of sensor inputs and the second pattern of sensor inputs each include a plurality of sensor inputs that is received from at least two distinct sensors.

Other embodiments include receiving at least one piece of identifying input at a mobile device. A user of the mobile device is identified based on the at least one piece of identifying input. When the identifying is successful, certain steps are performed. These steps include turning the mobile device on, unlocking the mobile device, and logging in to a user account belonging to the identified user.

Thus, embodiments may implement this technology as corresponding systems, apparatus, and computer programs, configured to perform the actions of the methods, encoded on computer storage devices. However, it may be noted that embodiments may include additional features not discussed above, or use alternative approaches to provide the functionality discussed above.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Figure 1:
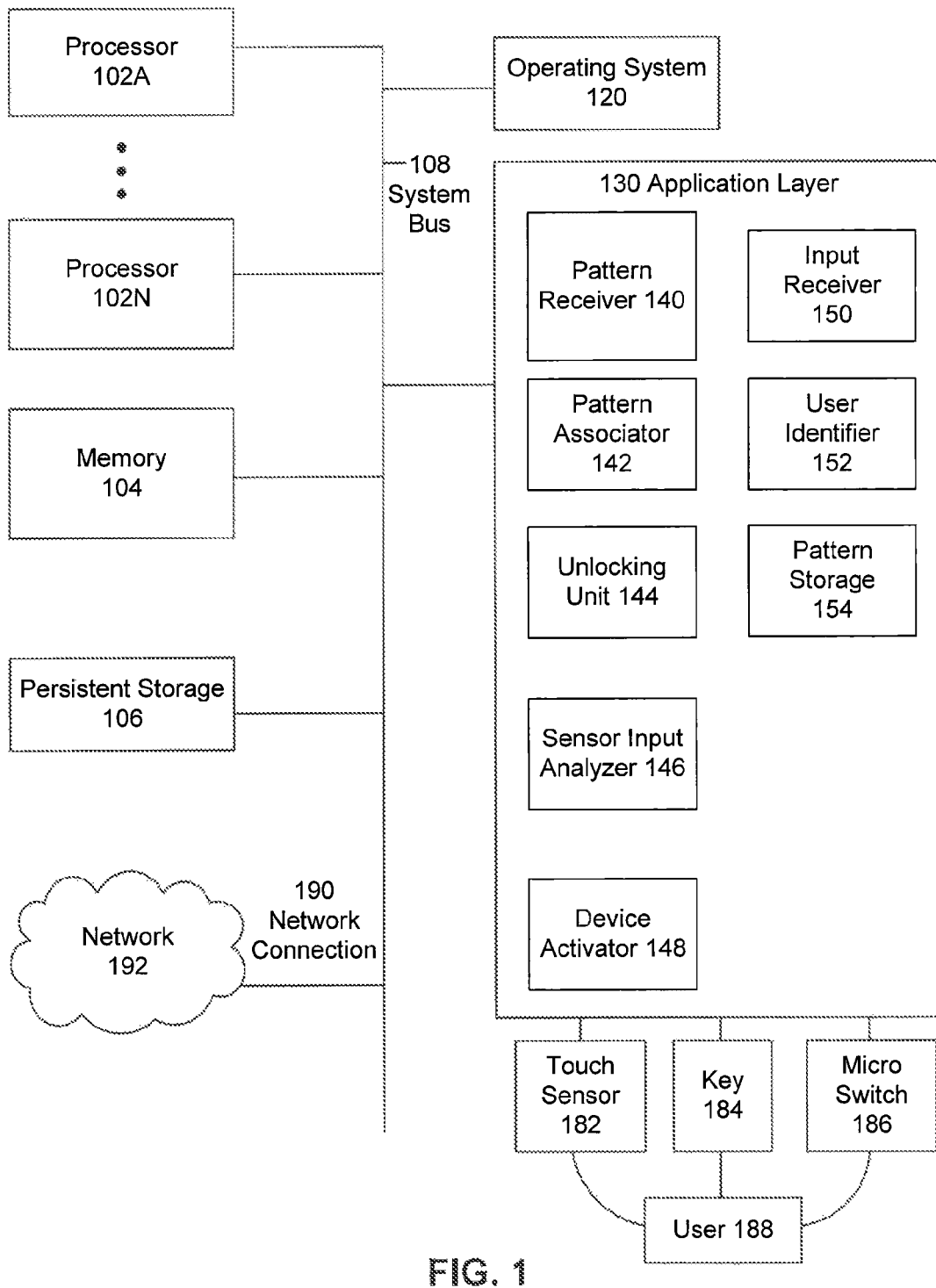
FIG. 1 is a diagram illustrating an exemplary system.

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Multiple sensors on the device that is to be activated (for example, touch sensors, keys and micro switches) allow for a user to specify a unique way that he or she would pick up and manipulate the device to uniquely identify himself or herself against other users. Such unique identification acts to both specify a specific user, and to prevent malicious or accidental inappropriate logins. For example, the manipulation of the device by the user may include identifying unique features such as finger and palm position, specific pressure at contact points and the acceleration of the device in different planes as it is picked up. A user could train the device to respond to a specific pattern and the device can be designed to reject patterns that do not include enough unique information according to security policies. For example, the security policies can be default settings or may be settings enforced by a device administrator in the case of corporate devices.

For example, a user might define a pattern as grasping the device at 5 points (each finger and a thumb), applying extra pressure on three of those points and holding the device such that his or her palm occludes the camera. If while holding the device in this matter, the user rotates it 90 degrees, the system may recognize this user uniquely and as he or she finishes rotating the device, it will unlock and be ready to use immediately as the result of picking up the device. For security, the unique points with extra pressure and the occlusion of the camera would not be obvious to a malicious user attempting to copy the pattern. As added security, additional points could be used by a second hand or the pattern could be extended to require a switch in position of the main hand. For example, the pattern could start with fingers in one place, involve rotating or shaking the device, and moving fingers to a second set of points.

Additional sensor technologies may be used to extend the device by creating new inputs to add into the pattern necessary to unlock the device. For example, audio cues may be obtained from a microphone and other input methods could provide extensions. Alternatively, an embodiment that uses a camera may include image or face recognition technology as part of a pattern. In addition to input methods already recognized in the art, new input methods may be integrated into the device as they are developed.

These techniques can be implemented using a mobile device, such as a tablet or mobile phone. However, other mobile devices may be used, as discussed below. Using such a mobile device, the sensors will detect patterns of inputs. While the nature of patterns is discussed in greater depth below, it may be noted that a mobile device may register a set of inputs as a group and require that all of the actions that comprise a pattern have occurred. Alternatively, it may identify a pattern based on a set of inputs that are received in a specific order. It may be noted that recognizing patterns may involve providing for variability of input.

FIG. 1 is a diagram illustrating an exemplary system. Mobile device 100 receives and recognizes patterns of input, and prepares itself for use in response.

Mobile device 100 includes a combination of hardware, software, and firmware constituent parts that allow it to run an application layer 130 with access to additional resources over a network 192 via a network connection 190. Mobile device 100 may be a portable computing device such as a laptop or notebook PC, but it may additionally be another portable electronic device such as a game console, a tablet, a netbook or a smartphone. In this context, a portable mobile device 100 generally reflects that it is easy to transport mobile device 100 from place to place, and mobile device 100 may furthermore may be handheld. Mobile device 100 as shown in FIG. 1 may be organized around a system bus 108, but any type of infrastructure that allows the hardware infrastructure elements of mobile device 100 to communicate with and interact with each other may be used to function as this part of mobile device 100. While FIG. 1 illustrates a mobile device 100, it is to be noted that a stationary computing device that also receives input patterns may identify input patterns in a similar manner to activate the stationary computing device.

The processing task in the embodiment of FIG. 1 is carried out by one or more processors 102A . . . 102N, but it should be noted that any type of processing technology may be used here, including multi-core processors, multiple processors, or distributed processors.

In order to manipulate data, processors 102A . . . 102N access a memory 104 via system bus 108. For data which needs to be stored more permanently, processors 102A . . . 102N access persistent storage 106. Processors 102A . . . 102N, memory 104 and persistent storage 106 operate in coordination with operating system 120 to provide basic functionality for mobile device 100. Operating system 120 provides support functionality for application layer 130.

Additionally, mobile device 100 includes several input subsystems to help it receive information included in various activation patterns. For example, mobile device 100 may be coupled to a touch sensor 182 (such as a front or rear touchscreen), a key 184, or a micro switch 186. Key 184 may include an input subsystem that is a button that may be pushed to provide an input signal, while micro switch 186 may include an input subsystem that is a physical switch which may be manipulated to occupy a plurality of positions. However, these are only some examples of potential input subsystems. A wider variety of subsystems is provided for below as portrayed in the example of FIG. 4A.

It should be noted that one aspect of the way embodiments receive and use patterns is that a pattern may use a plurality of inputs that is received from at least two distinct sensors. By using a plurality of sensor inputs from at least two distinct sensors, the activation process is able to improve its security by making it less likely that a pattern will be accidentally or maliciously duplicated. Additionally, these embodiments allow patterns to include more information than a single sensor input, or even a plurality of sensor inputs from a single sensor. In this way, mobile device 100 receives more information, which can be used to provide parameters for the activation process. For example, having more information may allow mobile device 100 to ascertain not only that it should be turned on and unlocked, but a pattern may also include information to identify and authenticate user 188.

Application layer 130 includes several subsystems that help user 188 activate mobile device 100. In one embodiment, the functional subsystems include a pattern receiver 140, a pattern associator 142, an unlocking unit 144, a sensor input analyzer 146, and a device activator 148, an input receiver 150, a user identifier 152, and a pattern storage 154. It should be noted that not all embodiments will necessarily include all of these subsystems, and a subset of these subsystems may provide sufficient functionality. These subsystems interact with input received from the various sensors. The role of the subsystems is to manage the activation process, by receiving a pattern of input and causing an appropriate activation response.

In one implementation, pattern receiver 140 receives a pattern of sensor inputs from the user. Pattern associator 142 associates the sensor input pattern with unlocking the device. Unlocking unit 144 may respond to an appropriate pattern by unlocking, or rejecting an incorrect pattern. Sensor input analyzer 146 associates parts of an input pattern with one or more specific sensor inputs by user 188 such as one or more of a finger position, a palm position, a specific pressure at a contact point, or an acceleration of the device in on or more planes. Device activator 148 may turn mobile device 100 on in response to receiving an appropriate pattern. Pattern storage 154 provides information for other subsystems by providing access to previously generated patterns.

Another embodiment may use an alternative set of subsystems, including input receiver 150, user identifier 152, and device activator 148. In this context, input receiver 150 receives at least one piece of identifying input. User identifier identifies user 188 on the basis of the identifying input, based on previous data stored in pattern storage 154. Subsequently, when the identification is successful, device activator 148 activates the device. This activation process includes turning mobile device 100 on, unlocking mobile device 100, and logging into a user account belonging to identified user 188.

The operation of the subsystems is described in greater detail with the description of various method embodiments, as presented below.

Mobile device 100 may use network connection 190 to communicate with other processing machines via network 192. Network connection 190 may use an appropriate wired connection or appropriate wireless technology to access network 192. Network 192 may be the Internet, a local area network, or any other network 192 of machines with which mobile device 100 may exchange data.

Each of the constituent parts of a system embodiment may be implemented on any appropriate computer system. Such a computer system can include, but is not limited to, a personal computer, or a mobile device such as a mobile phone, workstation, embedded system, game console, television, set-top box or any other computer system. While a mobile device is a desirable type of system embodiment, another embodiment may be sufficient if input patterns can be used to activate a system, even if the hardware at which processing occurs is not portable. Further, the computer system can include, but is not limited to, a device having a processor and memory for executing and storing instructions. Software may include one or more applications and an operating system. Hardware can include, but is not limited to, a processor, memory and graphical user interface display. The computer system may also have multiple processors and multiple shared or separate memory components. For example, the computer system may be a clustered computing environment or server farm.

Each of the constituent parts of a system embodiment may be implemented in hardware, software, firmware, or any combination thereof. Likewise, modules or instructions that constitute operative parts of embodiments may utilize any type of structured memory, including a persistent memory. In examples, each, data storage infrastructure may be implemented as a relational database.

It should be noted that computer-readable medium embodiments may include any physical medium which is capable of having instructions encoded therein that may subsequently be used by a processor to implement methods described herein. Likewise, embodiments may include computer storage devices that operate in such a manner. Example physical media may include floppy discs, optical discs (e.g. CDs, mini-CDs, DVDs, HD-DVD, Blu-ray), hard drives, punch cards, tape drives, flash memory, and memory chips. For example, memory chips may include RAM memory chips. While certain types of RAM require refreshing to maintain their contents, it will be recognized that the inclusion of RAM is only meant to include a physical storage device that can store instructions for execution, and the computer-readable storage medium embodiments and storage devices are not intended to include signals or other non-physical approaches to storing instructions. Likewise, any other type of tangible, physical, persistent storage that can serve in the role of providing instructions to a processor may be used to store the instructions in these embodiments.

Figure 2:
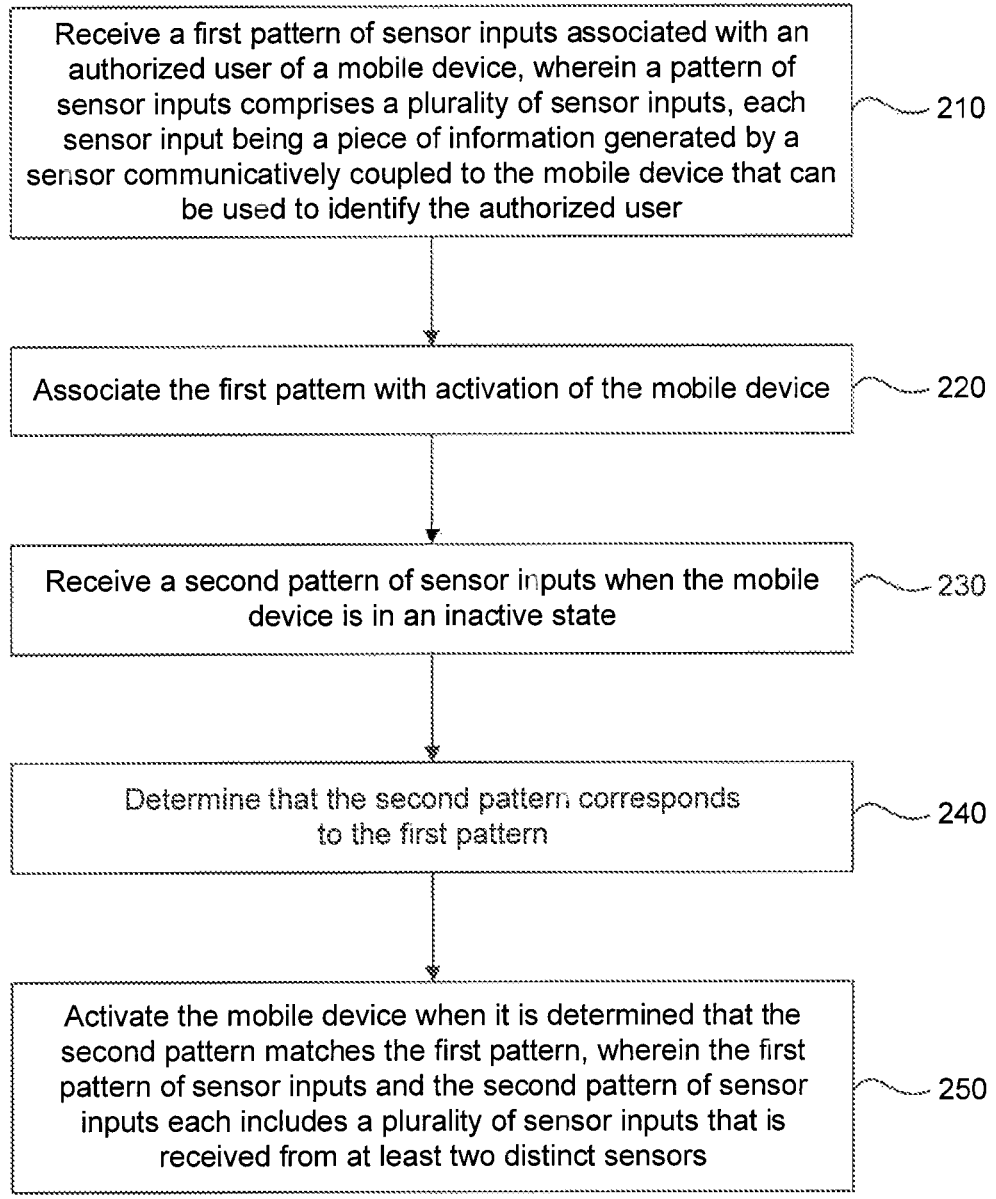
FIG. 2 is a flowchart of an exemplary method.

FIG. 2 is a flowchart of an exemplary method.

In 210, a first pattern of sensor inputs associated with an authorized user of a mobile device is received. A pattern of sensor inputs includes a plurality of sensor inputs, each sensor input being a piece of information generated by a sensor communicatively coupled to the mobile device that can be used to identify the authorized user. For example, pattern receiver 140 may receive a pattern of a plurality of sensor inputs of user 188. The one or more sensor inputs may include a variety of manipulations of mobile device 100. For example, the sensor inputs may include physical motions of the whole device. Such physical motions can include translating the mobile device, rotating the mobile device, twisting the mobile device, shaking the mobile device, and so on, such that user 188 changes the position or orientation of mobile device 100.

Figure 4A:
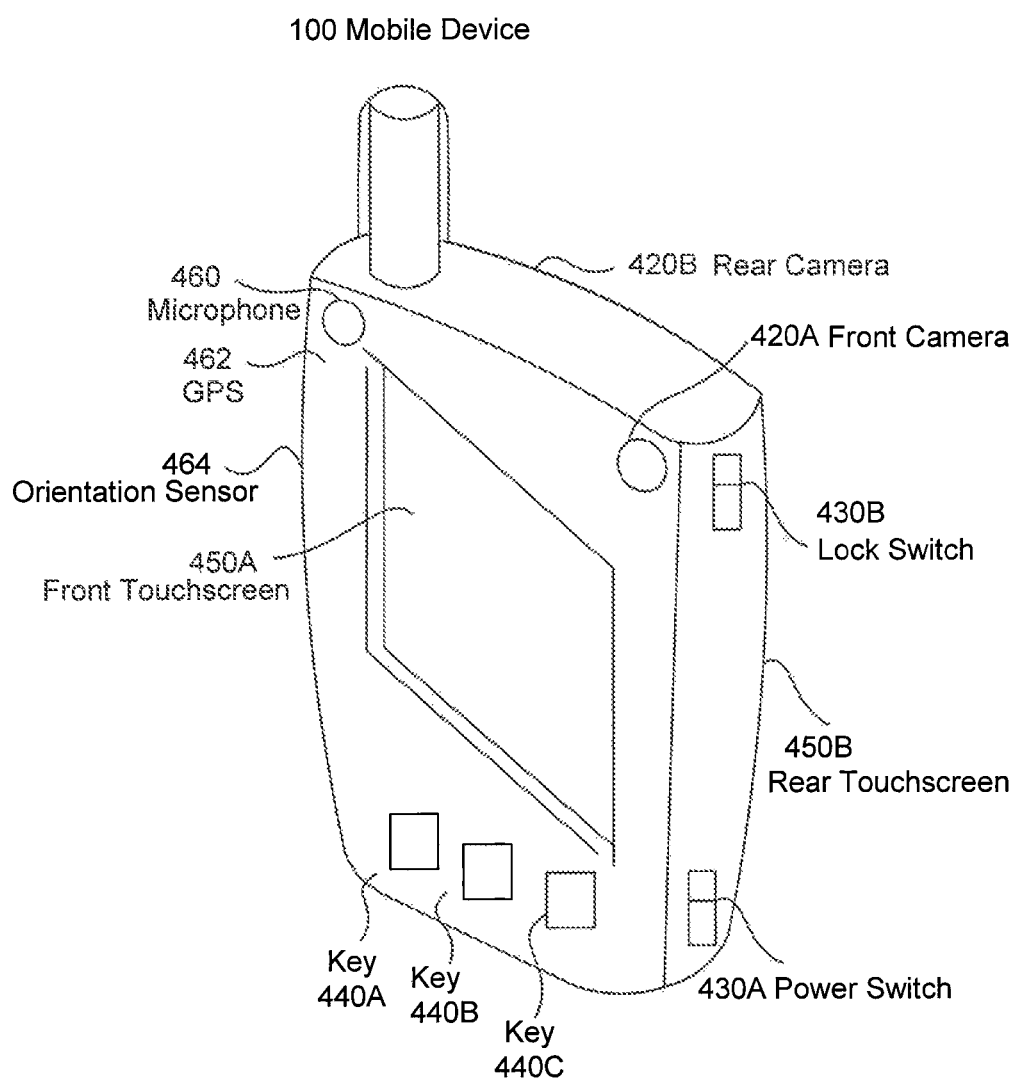
FIG. 4A is a diagram illustrating an exemplary mobile device.
Figure 4B:
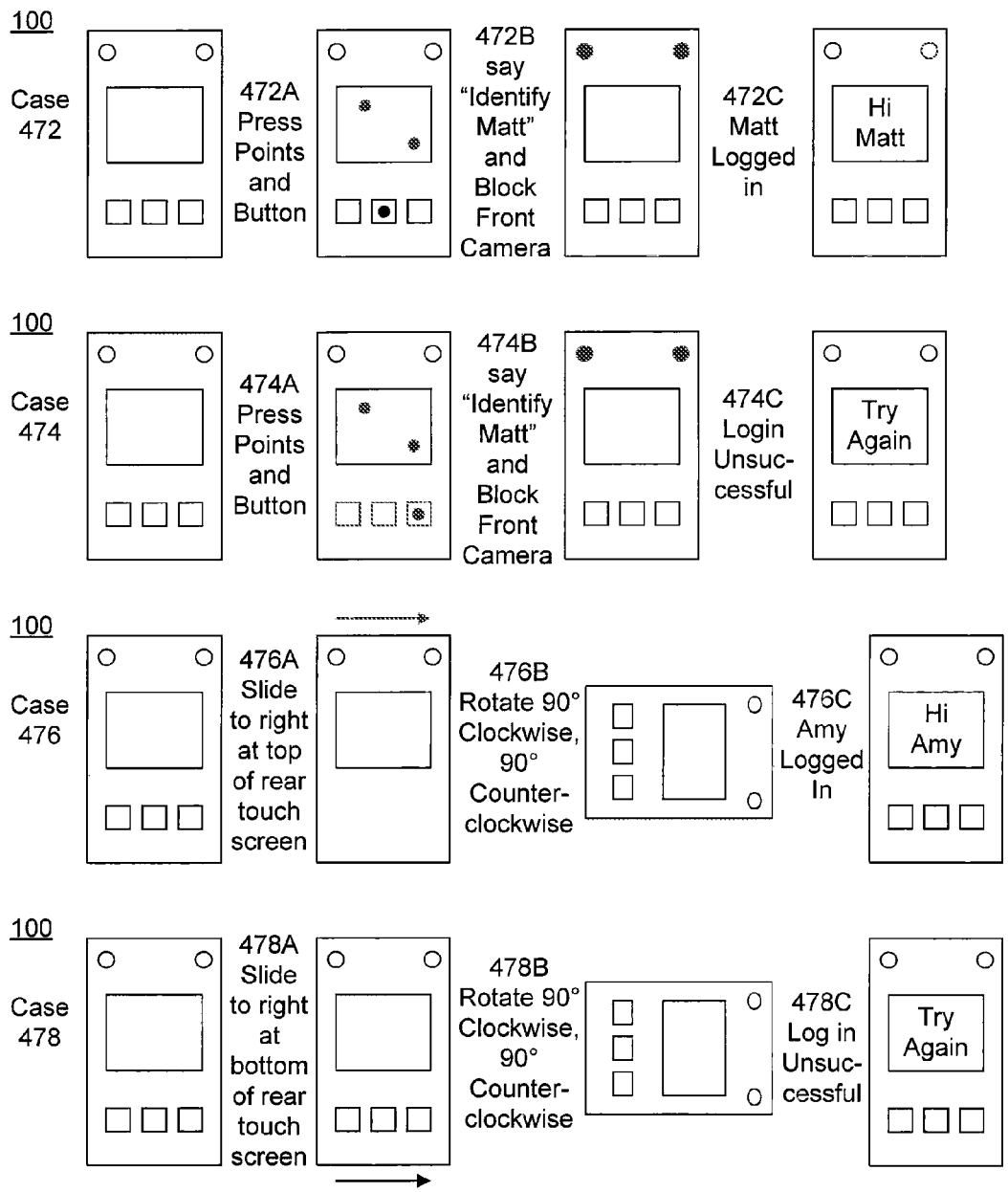
FIG. 4B is a diagram illustrating several use cases.

Alternatively, the sensor inputs may involve manipulating parts of the mobile device, such as pushing a button, sliding a switch, or providing touch input. Touch input may take many forms, including, but not limited to, touch input at a single location, multitouch input, or touch input that involves motion, such as a swipe or a pinch in or out. The one or more sensor inputs may be associated with one or more of a finger position, a palm position, a specific pressure at a contact point, or an acceleration of the device in one or more planes. It may be noted that multiple sensor inputs may occur simultaneously, for example rotating the device and performing a pinch touch input while rotating the device. Alternatively, multiple sensor inputs may occur in a prescribed order, or in discrete groups of sensor inputs. Sensor inputs may also include inputs for other types of sensors than those which involve motions or manipulations, such as audio or image sensors. FIGS. 4A-4B will provide further examples of how sensor inputs are used to provide for patterns.

In general, however, pattern receiver will begin to record information from various sensors associated with mobile device 100 when user 188 generates a sensor event after user 188 has indicated that he or she is ready to record his or her pattern, as discussed below. Sensor events occur when a sensor gathers data, for example, a touchscreen swipe or a key push. Sensor events may also include information from sensors that are indicative of motions. It may be desirable for mobile device 100 to listen for sensor events even when it is powered off, so that it may be ready to receive a pattern of sensor events when a series of inputs begin, or in order to save power a physical button, such as key 184, may need to be pressed to begin receiving a pattern. As noted above, one approach to receiving patterns is to simply record the occurrence of a set of inputs, while another approach to receiving patterns is to record not only the fact that a set of inputs has occurred, but also the timing of the events. The timing of the events may provide both order information and chronological information that may prove useful when attempting to identify a user based on a pattern. For example, it may be important that a user has swiped a touchscreen before shaking mobile device 100, or that there be at least or at most 5 seconds of delay between two separate button pushes. By the end of stage 210, the mobile device will have identified the sensor inputs in the pattern.

Stage 210 is performed in a manner such that user 188 realizes that he or she is defining a pattern by recording a group of sensor events that will subsequently identify himself or herself. User 188 may initiate the recording of the sensor event in the pattern in a number of ways. For example, mobile device 100 may allow user 188 to begin recording by selecting a graphical user interface control, such as a button, menu item, or link. Alternatively, some type of physical input (such as pressing a button or group of buttons) may allow for the creation of a new pattern. Such a graphical user interface control may be an appropriate part of a set up screen.

For example, when the device is first used (or a similar time when no patterns are defined, such as after a hard reset), mobile device 100 may prompt user 188 to select a control that will cause recording of the sensor inputs involved in a pattern. Mobile device 100 should be able to receive further input to establish an appropriate user identity and authenticate the user. For example, user 188 may input a user id and a password so that mobile device 100 can establish which user account to associated the recorded pattern with when the pattern is stored in pattern storage 154. It may be noted that user 188 may login to establish the account associated with the pattern either prior to or after recording the pattern, without limitation. It may be further noted that there is a one-to-many relationship between users and patterns, such that one user may be identified by multiple patterns, but each pattern identifies exactly one user.

However, pattern association can also occur after mobile device 100 has completed initial setup. This process occurs in a manner similar to the process discussed above wherein no patterns are defined. User 188 navigates to a control, such as one located in a setup screen, and activates the control to record the pattern. User 188 also associates the pattern with an account for user 188.

In stage 220, the first pattern is associated with activation of the mobile device. For example, pattern associator 142 may perform stage 220 by storing information about the pattern in pattern storage 154. In order to perform the storage, pattern associator 142 may represent the pattern as a set of sensor inputs in pattern storage 154. For example, the pattern may be stored as markup language, fields in a database, or by using any other storage architecture with which the pattern may be associated subsequently. Furthermore, the pattern may be represented by using tolerances and ranges so as to provide the best possible recognition. For example, if a piece of input for the pattern is to push the upper-left corner of a front-facing touchscreen, there may be a range of contact points and acceptable pressures that can be used thereafter to match this pattern. User 188 may need to supply the pattern two or more times to confirm that he or she has used a consistent pattern. Multiple pattern submission information can be used to help establish the tolerances. However, in general, pattern matching is more sophisticated than simple tolerances.

In stage 230, a second pattern of sensor inputs is received when the mobile device is in an inactive state. For example, mobile device 100 may be in a locked state if it has been left idle or if user 188 has locked it. Pattern receiver 140 receives the second pattern so it can be subsequently compared to the first pattern by unlocking unit 144 and sensor input analyzer 146, as will be discussed below.

Use cases of the input receipt process are provided in FIG. 4B. Stage 230 receives a pattern of inputs from various input devices, such as a touch sensor 182, key 184, and micro switch 186. The pattern received in stage 230 is analogous to the pattern of stages 210 and 220 in that it involves information that can be used to identify a legitimate activation attempt.

In stage 240, it is determined that the second pattern corresponds to the first pattern. For example, sensor input analyzer 146 and unlocking unit 144 may be configured to process input from user 188 received in stage 230 by pattern receiver 140. Unlocking unit 144 then makes a determination as to whether the first pattern and second pattern match.

For example, as discussed in connection with stage 220, there may be an allowable range into which the subsequent pattern of inputs must fall. Unlocking unit 144 checks whether the inputs in the current pattern correspond with the pattern associated with the unlocking by determining whether the inputs fall into the appropriate ranges of allowable inputs. If so, unlocking unit 144 unlocks mobile device 100 in stage 250. If the sensor input does not match the one or more sensor inputs associated with the pattern, then unlocking unit 144 will maintain the lock on the mobile device. In addition, the unlocking process provided by unlocking unit 144 may also include turning on mobile device 100 based on the received indication. Machine learning techniques may be used to implement sophisticated pattern recognition techniques (similar to image or voice recognition).

In stage 250, the mobile device is activated when it is determined that the second pattern matches the first pattern, wherein the first pattern of sensor inputs and the second pattern of sensor inputs each include a plurality of sensor inputs that is received from at least two distinct sensors. As was discussed above, the use of a plurality of sensor inputs that is received from at least two distinct sensors allows a pattern to include more information, helping to increase the security, reliability, and versatility of an embodiment that uses this type of pattern.

For example, unlocking unit 144 may carry out several tasks related to activating mobile device 100. These activation steps include logging a user on (and authenticating the user), powering the mobile device on, and causing the mobile device to wake up. These activation steps will be discussed in further detail, below.

Figure 3:
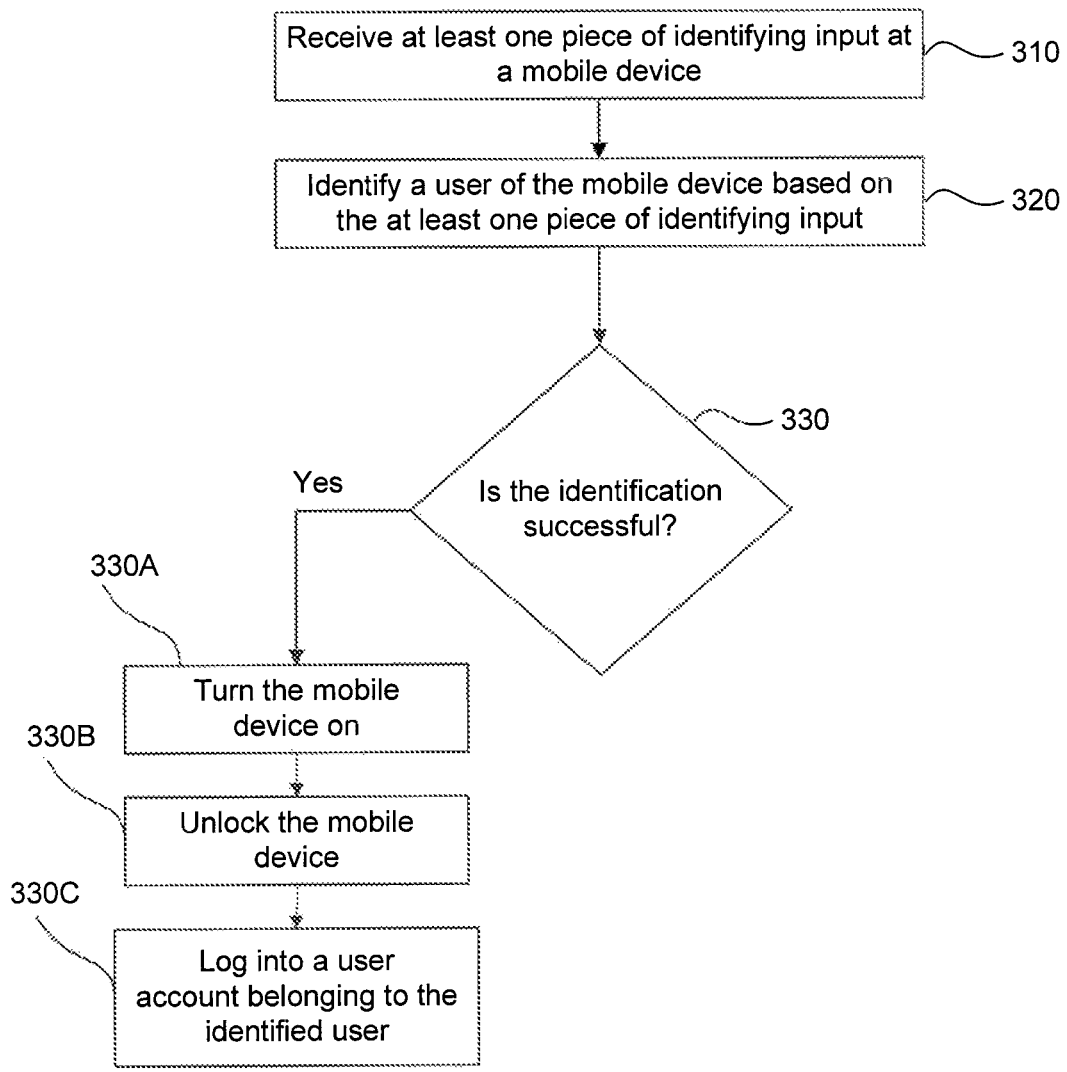
FIG. 3 is another flowchart of another exemplary method.

FIG. 3 is another flowchart of another exemplary method.

In stage 310, at least one piece of identifying input is received at a mobile device. Identifying input can include sensor inputs as discussed above. However, any form of input that can be received by mobile device 100 may be used as identifying input. For example, a wide variety of sensors that produce identifying inputs are provided in FIG. 4A, discussed below. Example inputs may include image or video inputs, audio inputs, motion inputs (which may include information about changes of location and orientation, as well as inputs based on contact, such as touch inputs or key presses), or any other input that mobile device 100 can receive from user 188. These example inputs are illustrative only, and should not be understood to limit potential inputs. It may be noted that the inputs may include other inputs than motion inputs. For example, stage 310 may be performed by an input receiver 150. Input receiver 150 receives multiple inputs from various sensors in a manner similar to the operation of pattern receiver 140 as discussed above. Like pattern receiver 140, input receiver 150 may record both which specific pieces of input it receives, as well as ordering and/or chronological information.

In stage 320, a user of the mobile device is identified based on the at least one piece of identifying input. For example, stage 320 may be performed by user identifier 152 in conjunction with pattern storage 154. It should be noted that in this embodiment, pattern storage 154 has previously stored records of patterns associated with various users. These stored patterns may be provided in various ways, such as a markup language or alternative textual representation of the patterns, entering the content of patterns with a GUI, or providing machine learning functionality that records a pattern as a user performs it. As discussed above, patterns of input may be associated with ranges or tolerances, such that there may be some variation between patterns of input that are judged to be acceptable.

An example of the identification process is discussed below in connection with FIGS. 4A-B, below. However, in general identifying proceeds as follows. Pattern storage 154 includes information about previously obtained patterns. For example, obtaining patterns is discussed in the context of stage 210, above. Patterns contain information about inputs and their ordering that may be used to establish the identity of a user of the mobile device. This information includes not only the type of input, but additionally may include ordering information. Based on the pattern, ranges of input are determined to be valid. For example, an input involving rotating mobile device 100 by ninety degrees clockwise could specify a range of a seventy-five to one hundred five degree clockwise rotation as a valid match for this input.

If all of the pieces of identifying input are within range of the inputs in the pattern, the user of the mobile device is determined to be the user associated with the pattern. If no pattern matches, mobile device 100 may offer options such as trying again or an alternative login approach. If multiple patterns match, a variety of approaches may be used to determine which is the closest match. For example, if multiple patterns match, the ranges may be automatically narrowed until only one pattern matches. However the system may also prevent users from recording patterns that are too similar to each other.

In stage 330, a determination is made as to whether the identification was successful. In general, this determination may be made by receiving a message from user identifier 152 that indicates the results of stage 320, requesting the results of stage 320 from user identifier 320, or so on. If the identification was successful, the method branches to stages 330A-C to activate mobile device 100, given the determined identity. If the identification was not successful, no further method stages are performed. For example, stage 330 may be based on the results provided by user identifier 152 and pattern storage 154. Optionally, if the identification was unsuccessful, mobile device 100 may provide alternative methods of activating mobile device 100, such as entering a passcode.

In stage 330A the mobile device is turned on. For example, stage 330A may be performed by device activator 148. This process of turning the device on is a response to stages 310, 320, and 330, that occurs in the case where the identification of stage 320 was confirmed to be successful in stage 330. Thus, turning the mobile device on is an activation step that occurs when user 188 is successfully identified based on the input. In stage 330A, device activator powers on mobile device 100 and mobile device 100 will boot up in response.

In stage 330B, the mobile device is unlocked. For example, stage 330B may be performed by device activator 148. This process of unlocking the device is a response to stages 310, 320, and 330, that occurs in the case where the identification of stage 320 was confirmed to be successful in stage 330. Thus, unlocking the mobile device is another activation step that occurs when user 188 is successfully identified based on the input. In stage 330B, device activator unlocks mobile device 100. It may be noted that not every mobile device 100 will necessary include a locking feature, and hence stage 330B may not be relevant for a mobile device 100 that does not lock.

It may be noted that the order of 330A and 330B may vary, in that powering on may occur before or after unlocking.

In stage 330C, a user account belonging to the identified user is logged into. This stage of logging into a user account is a response to stages 310, 320, and 330, that occurs in the case where the identification of stage 320 was confirmed to be successful in stage 330. Thus, logging into a user account is another activation step that occurs when user 188 is successfully identified based on the input. For example, stage 330C may be performed by device activator 148. In stage 330C, device activator automatically logs into mobile device 100 as identified user 188. To facilitate the activation process, providing a correct pattern of input may serve as authentication in lieu of other approaches such as a passcode or biometric identification. It may be noted that not every mobile device 100 will necessary include separate user accounts and/or configurations, and hence stage 330C may not be relevant for a mobile device 100 that does not provide separate users with separate accounts.

FIG. 4A is a diagram illustrating an exemplary mobile device. FIG. 4B is a diagram illustrating several use cases. FIGS. 4A-B provide for example patterns 400 that are portrayed in use cases 472-478.

FIG. 4A illustrates various sensors that are included in mobile device 100. While mobile device 100 is generally characterized as a smartphone in FIG. 4A, as discussed above mobile devices 100 need not be limited to smartphones, and a wide variety of alternative mobile devices may be used.

FIG. 4A provides for a wide variety of sensors in mobile device 100, potentially including a front camera 420A, a rear camera 420B, a power switch 430A, a lock switch 430B, several keys 440A, 440B, and 440C, a front touchscreen 450A, a rear touchscreen 450B, a microphone 460, a GPS 462, and an orientation sensor 464. It should be noted that sensors 420A-464 are merely illustrative examples of sensors that mobile device 100 may include. For example, a given mobile device 100 may include a subset of sensors 420A-464, as well as other sensors not illustrated in FIG. 4A. Furthermore, sensors included in mobile device may be of different sizes or in different positions than illustrated. Additionally, sensors may not be integrated into mobile device 100, as mobile device may use sensors that are connected to it via an appropriate wired or wireless connection, or remote sensors from network 190 via network connection 190. The important defining characteristic of the sensors is that they provide recognizable input to mobile device 100 that it can use when defining patterns or recognizing them subsequently.

Several use cases 472-478 are provided in FIG. 4B. Each of these cases provides for an initial state of mobile device 100 previous to receiving any input from user 188, along with microphone 460 in the upper left and front camera 420A in the upper right, as well as front touchscreen 450A, rear touchscreen 450B and keys 440A, 440B, and 440C. As discussed above in connection with FIG. 4A, this set of sensors is merely an illustrative subset of potential sensors that may be used in input patterns.

One goal of the activation process is to minimize false positives and false negatives. A false positive occurs when a pattern is accepted even though it is incorrect. It is important to minimize false positives because accepting false positives may lead to situations in which users are accepted by accident or a malicious user is accepted. While of course it is not possible to prevent activation by a malicious user who knows the pattern, in general patterns should be difficult to duplicate by chance and therefore this feature of patterns will frustrate malicious users and avoid accidental activation.

However, it is also important to minimize false negatives. A false negative occurs when a pattern is not accepted, even though it should be correct. However, as discussed previously, patterns may pertain to ranges of input. In some cases, inputs may not have any ambiguity. For example, an input may record whether a key is pressed or not pressed. However, other inputs, such as swipes on a touchscreen, may need to factor in tolerances and ambiguity, such as by providing ranges of starting points, trajectories, end points, swipe speed, and so on. False negatives frustrate users and make logins difficult, and hence providing flexible recognition is desirable to promote ease-of-use.

It is important to provide a balance between minimizing false positives and false negatives, so that inappropriate logins are defeated, but legitimate users do not face excessive problems with logging in.

For example, use cases 472 and 474 illustrate an example input login pattern. Case 472 illustrates the pattern performed successfully. In stage 472A, user 188 presses points in the upper left and lower right of front touchscreen 450A, as well as middle key 440B. In stage 472B, the user says "Identify Matt", which causes microphone 460 to record and recognize this audio cue. It may be noted that an audio cue may be recognized in association with a particular user voiceprint, the content of what is said, or both. It is assumed that in stage 472B, the user who says "Identify Matt" is in fact Matt and hence both the content and the voiceprint match what is expected. Also in stage 472B, the user blocks front camera 420A. The result of this set of inputs is that the user Matt is logged in stage 472C, causing front touchscreen 450A to display "Hi Matt" to indicate a successful login by Matt.

Case 474 illustrates the pattern of case 472 performed unsuccessfully. In stage 474A, user 188 presses points in the upper left and lower right of front touchscreen 450A, but presses right key 440C instead of middle key 440B. Stage 474B proceeds in accordance with stage 472B The result of this set of inputs is that the login is unsuccessful in stage 474C, causing front touchscreen 450A to display "Try Again" to indicate an unsuccessful login. The login will be unsuccessful because unlocking unit 144 or user identifier 152 (depending on the context) will discover that while the login input pattern is close to Matt's, the wrong key was pressed in stage 474A. Hence, login will be unsuccessful. User 188 may try again, or alternatively use other activation methods.

Use cases 476 and 478 illustrate another example input login pattern. Case 476 illustrates the pattern performed successfully. In stage 476A, user 188 slides a finger to the right at the top of rear touchscreen 450B. As discussed previously, there may be a certain degree of flexibility in recognizing this touchscreen input. In stage 476B, mobile device 100 is rotated 90° clockwise, then 90° counterclockwise. The result of this set of inputs is that the user Amy is logged in stage 476C, causing front touchscreen 450A to display "Hi Amy" to indicate a successful login by Amy.

Case 478 illustrates the pattern of case 476 performed unsuccessfully. Stages 478A and 478B match 476A and 476B, except that in stage 478A differs from stage 476A in that user 188 slides a finger along the bottom edge of rear touchscreen 450B. The result of this set of inputs is that the login is unsuccessful in stage 478C, causing front touchscreen 450A to display "Try Again" to indicate an unsuccessful login by Amy. The login will be unsuccessful because unlocking unit 144 or user identifier 152 (depending on the context) will discover that while the login input pattern is close to Amy's, there was a gross difference between the inputs and the pattern, in that the touch input was quite different from what was expected. Hence, login will be unsuccessful. User 188 may try again, or alternatively use other activation methods.

However, it should be noted that it is important to distinguish attempted activations from random sensor noise. For example, by carrying a smartphone in a purse, user 188 may move mobile device 100 in a manner that may cause it to receive motion information or other sensor inputs, such as sound inputs. However, these sensor inputs are not intended as activations, and hence it may be desirable to find a way to let mobile device 100 ascertain that a pattern is actually about to begin for recognition, rather than constantly have mobile device 100 generate feedback rejecting inputs solely based on sensor noise. One way to accomplish this goal is to always start a pattern with a physical event, such as pressing key 184 or changing the position of micro switch 186, such that it is unlikely to be triggered by accident. However, other approaches exist that will help differentiate between successful activations, unsuccessful activation attempts, and motion data that should simply be ignored.

Functionality is provided for activating a mobile device based on a pattern of sensor inputs, such as motions, touch inputs, and other inputs. Mobile device 100 may be prepared though various input strategies, such as machine learning to associate patterns of input with various stages of activating mobile device 100, including turning the device on, unlocking the device, identifying a user, and authenticating the user.

Embodiments provide an advantageous approach to activating mobile device 100 in that multiple stages of activation are merged into one easy process. Furthermore, embodiments provide increased security, in that while an input pattern may be straightforward to enter for the appropriate user, input patterns are not likely to be replicated accidently or to able to be guessed easily by malicious users.

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method comprising:
   receiving, by a processor of a computing device and while the computing device is in an inactive state, a plurality of sensor inputs for logging into a user account associated with the computing device, the computing device being associated with a plurality user accounts, each respective user account being associated with a respective distinct input pattern for logging into the respective user account;
   responsive to determining, by the processor and while the computing device is still in the inactivate state, that the plurality of sensor inputs define an input pattern that is within a first predetermined range of two or more distinct input patterns associated with two or more respective user accounts from the plurality of user accounts, automatically selecting a second predetermined range, wherein the second predetermined range is narrower than the first predetermined range; and
   responsive to determining, by the processor, that the input pattern is within the second predetermined range of only a first input pattern from the two or more distinct input patterns, activating the computing device, wherein activating the computing device comprises transitioning the computing device to an active state and logging into a user account from the plurality of user accounts that is associated with the first input pattern.

2. The method claim 1, wherein the plurality of sensor inputs are received in a prescribed order, and wherein each of the two or more distinct input patterns correspond to a respective plurality of sensor inputs also received in the prescribed order.

3. The method claim 1, wherein the two or more distinct input patterns are stored in a markup-language representation.

4. The method claim 1, wherein criteria for determining whether the input pattern is within the first predetermined range of another input pattern is established via machine learning.

5. The method claim 1, wherein each respective sensor input of the plurality of sensor inputs corresponds to a respective portion of the input pattern, and wherein the determining the input pattern is within the first predetermined range of another input pattern comprises comparing each of the respective portions of the input pattern to respective corresponding portions of the other input pattern.

6. The method claim 1, wherein the inactive state comprises a different user account from the first user account being logged into the computing device.

7. The method claim 1, wherein the inactive state comprises no user account being logged into the computing device.

8. A non-transitory computer-readable medium that stores instructions that, when executed by a processor of a computing device, cause the computing device to perform a method comprising:
   receiving, by the processor of a computing device and while the computing device is in an inactive state, a plurality of sensor inputs for logging into a user account associated with the computing device, the computing device being associated with a plurality user accounts, each respective user account being associated with a respective distinct input pattern for logging into the respective user account;
   responsive to determining, by the processor and while the computing device is still in the inactivate state, that the plurality of sensor inputs define an input pattern that is within a first predetermined range of two or more distinct input patterns associated with two or more respective user accounts from the plurality of user accounts, automatically selecting a second predetermined range, wherein the second predetermined range is narrower than the first predetermined range; and
   responsive to determining, by the processor, that the input pattern is within the second predetermined range of only a first input pattern from the two or more distinct input patterns, activating the computing device, wherein activating the computing device comprises transitioning the computing device to an active state and logging into a user account from the plurality of user accounts that is associated with the first input pattern.

9. The non-transitory computer-readable medium of claim 8, wherein the plurality of sensor inputs are received in a prescribed order, and wherein each of the two or more distinct input patterns correspond to a respective plurality of sensor inputs also received in the prescribed order.

10. The non-transitory computer-readable medium of claim 8, wherein the two or more distinct input patterns are stored in a markup-language representation.

11. The non-transitory computer-readable medium of claim 8, wherein criteria for determining whether the input pattern is within the first predetermined range of another input pattern is established via machine learning.

12. The non-transitory computer-readable medium of claim 8, wherein each respective sensor input of the plurality of sensor inputs corresponds to a respective portion of the input pattern, and wherein the determining the input pattern is within the first predetermined range of an other input pattern comprises comparing each of the respective portions of the input pattern to respective corresponding portions of the other input pattern.

13. The non-transitory computer-readable medium of claim 8, wherein the inactive state comprises a different user account from the first user account being logged into the computing device.

14. The non-transitory computer-readable medium of claim 8, wherein the inactive state comprises no user account being logged into the computing device.

15. A system comprising:
   at least one processor of a computing device;
   at least one sensor, coupled to the processor, for generating sensor inputs; and
   at least one memory operatively coupled to the at least one processor and configured for storing data and instructions that, when executed by the at least one processor, cause the system to perform a method comprising:
      receiving, by the at least one processor and while the computing device is in an inactive state, a plurality of sensor inputs, from the at least one sensor, for logging into a user account associated with the computing device, the computing device being associated with a plurality user accounts, each respective user account being associated with a respective distinct input pattern for logging into the respective user account;
      responsive to determining, by the at least one processor and while the computing device is still in the inactivate state, that the plurality of sensor inputs define an input pattern that is within a first predetermined range of two or more distinct input patterns associated with two or more respective user accounts from the plurality of user accounts, automatically selecting a second predetermined range, wherein the second predetermined range is narrower than the first predetermined range; and
      responsive to determining, by the at least one processor, that the input pattern is within the second predetermined range of only a first input pattern from the two or more distinct input patterns, activating the computing device, wherein activating the computing device comprises transitioning the computing device to an active state and logging into a user account from the plurality of user accounts that is associated with the first input pattern.

16. The system of claim 15, wherein the plurality of sensor inputs are received in a prescribed order, and wherein each of the two or more distinct input patterns correspond to a respective plurality of sensor inputs also received in the prescribed order.

17. The system of claim 15, wherein the two or more distinct input patterns are stored in a markup-language representation.

18. The system of claim 15, wherein criteria for determining whether the input pattern is within the first predetermined range of another input pattern is established via machine learning.

19. The system of claim 15, wherein each respective sensor input of the plurality of sensor inputs corresponds to a respective portion of the input pattern, and wherein the determining the input pattern is within the first predetermined range of an other input pattern comprises comparing each of the respective portions of the input pattern to respective corresponding portions of the other input pattern.

20. The system of claim 15, wherein the inactive state comprises a different user account from the first user account being logged into the computing device.

* * * * *